Figure 1:
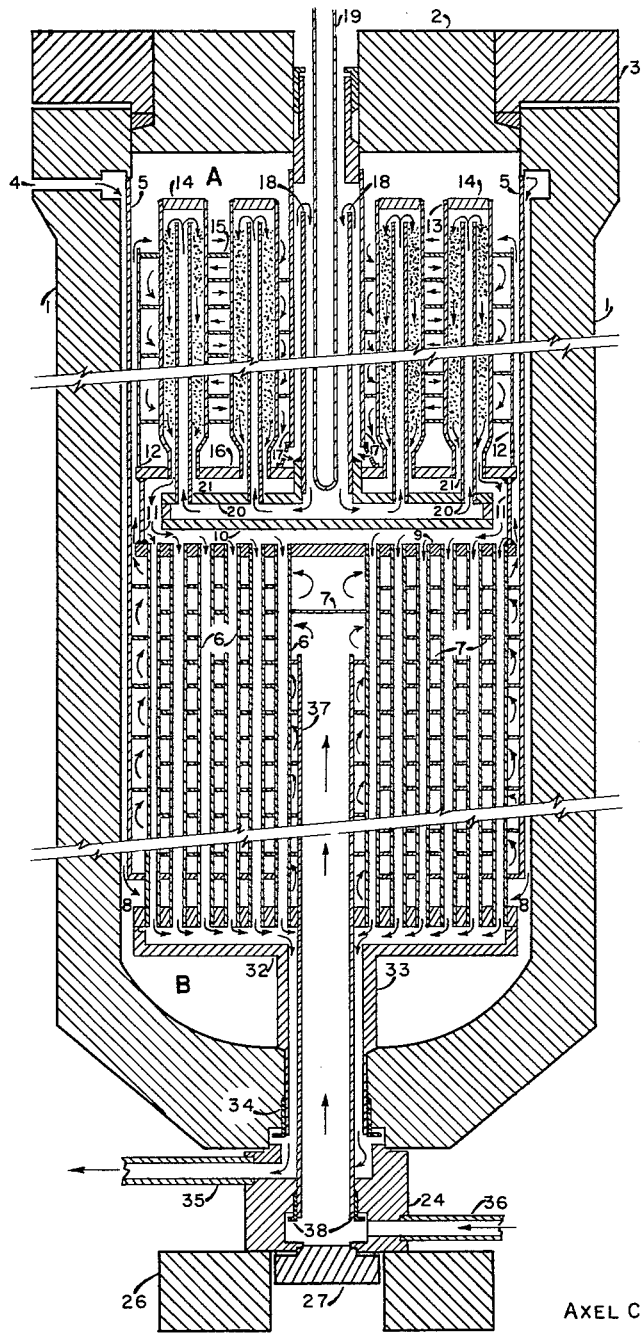

Aug. 21, 1962  A. CHRISTENSEN  3,050,377
CONVERTER

Filed July 21, 1958  2 Sheets-Sheet 1

AXEL CHRISTENSEN.
INVENTOR.

BY J. W. McCloskey
AGENT

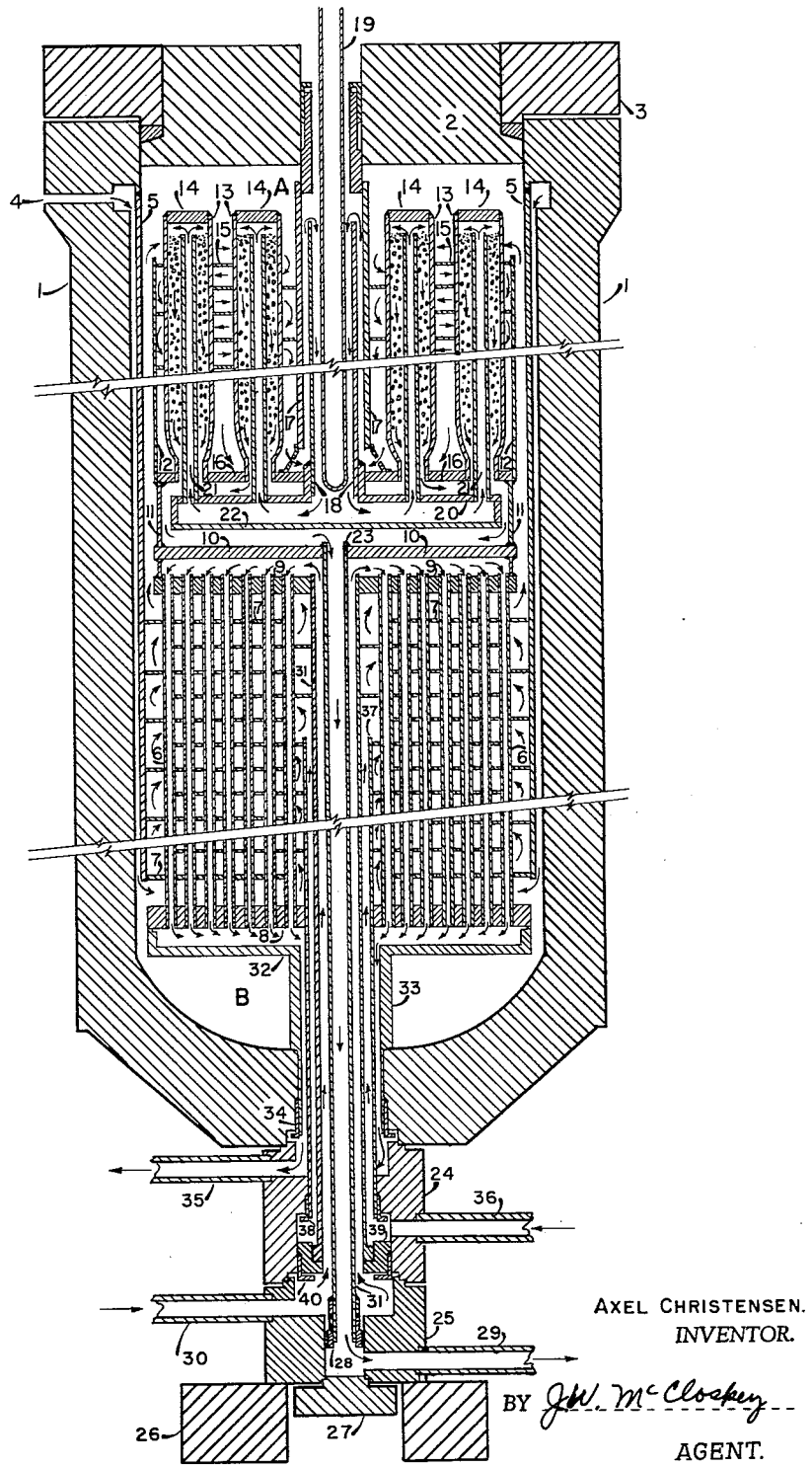

United States Patent Office 3,050,377
Patented Aug. 21, 1962

3,050,377
CONVERTER
Axel Christensen, Stamford, Conn., assignor to Chemical Construction Corporation, New York, N.Y., a corporation of Delaware
Filed July 21, 1958, Ser. No. 749,860
7 Claims. (Cl. 23—289)

This invention is concerned with an improved apparatus for and the method of carrying out exothermic reactions at high temperatures and pressures. It is particularly concerned with the means and method of directing cooling gases around the outside of the catalyst-containing tubes in a manner co-current to the flow of gas through the catalyst thereby permitting close control of the temperature within the catalyst bed. The invention is further concerned with the generation of steam by utilizing the heat contained in the gases after synthesis reaction.

The prior converters commonly used for carrying out synthesis reactions at high temperatures and pressures are embodied in U.S. Patents 1,707,417, 1,909,378, and in the applicant's co-pending U.S. application Serial No. 533,068, filed September 8, 1955, now Patent No. 2,583,371. While these converters have competently controlled the temperatures of reactions in synthesis such as ammonia synthesis and methanol synthesis, they do not permit as close a temperature control as the present invention. Also they do not include provisions for generation of high pressure and high temperature steam from the heat of reaction in the synthesized gas. Heretofore, as typified in the prior processes, the cooling of the catalyst has been carried out by the co-current flow of gases in pipes embedded in the catalyst. By cooling according to this invention the cooling gas flows around tubes containing the catalyst directed by baffles which are spaced to give the desired heat transfer rate from gas around the tubes to the tube wall at any elevation of the catalyst tube. If no cooling is desired at the top part of the catalyst tubes then these tubes extend over the baffle shell 12.

Broadly, in this invention two streams of incoming gas are introduced into the heat exchanger section, one stream by-passing part of the heat exchanger and subsequently mixed with the other stream at a point in the exchanger close to the point where the gas leaves for the catalyst section. The mixed gases whose temperature is regulated within the heat exchanger section by regulating the ratio of the two streams flows to the adjacent catalyst section where it is directed by means of baffles to flowaround and about the tubes containing the catalyst in co-current flow with gasses passing through the catalyst. After cooling the catalyst by this co-current flow of gases the direction of said gases is reversed to flow counter-currently to the cooling gas through feed pipes within the catalyst. Thereafter the direction of the gases is again reversed to flow through the catalyst co-current with the first mentioned flow of cool gases about the catalyst tubes.

The gases whose temperature has been regulated within the catalyst bed by cooling gases circulating about the catalyst tubes are collected and delivered to a heat exchanger section where the heat contained in the gases is imparted to fresh synthesis gas entering the converter. After imparting heat to the incoming gases, the synthesized gas exits from the system and is delivered to further treatment for extraction of the synthesized compounds within said gas.

If it is desirable to recover heat from the gas stream leaving the catalyst bed, gases may be withdrawn at this point and sent to an external waste heat boiler where heat is extracted. Then the gases are returned from the boiler to the warm end of the heat exchanger section to flow through tubes in said section to pre-heat the incoming synthesis gas. With external steam generation the amount of incoming gas by-passing part of the heat exchanger may be restricted or dispensed with.

It is the principal object of this invention to control the temperature within the catalyst bed by flowing relatively cool synthesis gas over the tubes in a manner co-current to the flow of gases through the catalyst tube during synthesis reaction. A further object is the provision for generation of high pressure, high temperature steam when desirable. Other objects and improvements will be apparent in the following description of the preferred embodiments of this invention with respect to FIGURES 1 and 2.

Referring to FIGURE 1 there is shown a conventional pressure sustaining vessel having a shell 1 and suitable closure 2 with retaining ring 3. This pressure vessel contains two superimposed sections identified in FIGURE 1 as catalyst section "A" and heat exchanger section "B" with an intervening gas collecting and distributing section. In the description below that portion of the heat exchanger next to the catalyst section will be referred to as the "warm end" of the exchanger while the opposite end will be referred to as the "cold end" of the exchanger.

The cold process gas introduced at port 4 passes through the upper end of the vessel and flows down through the annulus formed between the high pressure shell and the liner 5 which is made tight against the high pressure shell above the gas inlet. At the bottom of the liner 5 gas enters from the shell side of the heat exchanger, flows about the tubes 6 in a counter-current heat exchange with gas inside the tubes, said process gas being directed about said tubes by the baffles 7. The preheated gas then passes up through an annulus between the liner 5 and the baffle shells identified as 11 and 12. These baffle shells surround both the gas collecting and distributing section and the catalyst section within the converter. The gas leaving the annulus between the liner 5 and the baffle shell 12 passes over the top of the shell 12 and flows across and along tubes 13 which contain the catalyst. These tubes 13 are shown as being capped with a removable plate 14, but any convenient means for enclosing a catalyst-containing tube would be suitable. As the gas flows around the catalyst tubes from the top of the shell to collecting area at the other end of the tubes 13, the gases pass around said tubes through paths limited by means of baffles 15. These baffles are spaced to give the desired heat transfer rate from gas around the tubes to the tube wall at any elevation of the catalyst tube. If no cooling is desired at the top part of the catalyst tubes then these tubes extend above the baffle shell, 12.

The tubes 13 are fastened in the tube sheet 16 to define a closed area at the lower end of said catalyst tubes. Here the cooling gases are collected adjacent to tube sheet 16 and directed to an annulus formed by the liners 17 and 18. A brace not numbered aids in holding the liner 17 to the tube sheet 16. The gases passing up through the annulus between liners 17 and 18 are then directed downwardly through a central tube which contains heating element 19. This heating element is used during startups. On being directed downwardly through the channel formed by the shell 18, the gases flow into a distributing chamber formed by a base plate 10 and a tube sheet 20. From this distributing section the gases flow upwardly through tubes 21 to a point near the uppermost portion of the catalyst tube where the course of the synthesis gas is again changed. From there the synthesis gas flows downwardly through the catalyst bed and into a distributing chamber defined by plates 9 and 10 where gases are distributed to flow through the tubes 6. While the heated gases pass downwardly through tube 6, additional cool gas enters the converter both through the port 4 and through the bypass tube 36. The latter tube which enters the bottom of the converter is connectively joined to a tube 37. These tubes 36 and 37 cause the gas to flow upwardly through the center of the interchanger to be mixed with the incoming gases from port 4 at the hot end of the exchanger. From this point the mixed gas flows around the tubes 6, thence upwardly to the top of the baffle shell 12.

The gas leaving the tubes 6 at the cold end of the exchanger is collected in a chamber defined by lower tube sheet 8 and a bottom plate 32. From this chamber the gas is directed out of the converter through the tube 33 and to the outlet tube 35 to further processing. The tube 33 is made tight against the high pressure shell by a stuffing box 34. Attached to the shell 1 is the connector 24 which defines a space for directing gases to tube 35 and also defines a space which allows gases coming in by by-pass 36 to flow upwardly to tube 37 to a section near the warm end of the heat exchanger. Section 24 with tubes 35 and 36 is held in place by means of base plate 26 and is closed off by plate 27. Tube 37 is made tight against section 24 by a stuffing box 38 through which tube 37 can expand.

If, as is frequently the case, it is desirable to translate a part of the heat of reaction derived from synthesis into high pressure, high temperature steam, the internal structure of the autoclave can be modified in a manner similar to that shown in FIGURE 2 to conduct the hot gas leaving the catalyst tubes to an external waste heat boiler. In this figure a baffle plate 22 separates the heat exchanger section B from the catalyst section A and the hot gas leaving the catalyst is collected above said baffle plate and delivered to central tube 23 fastened to the center portion of plate 22. The central tube 23 terminates within a block 25. This block 25 is closed off by a cover 27 and attached to a similar block 24 which is positioned between the shell 1 and the section 25. Both blocks are maintained in place by means of block 26 which is attached to the shell 1 by means of bolts not shown. At the lower end of tube 23 the contraction and expansion is accommodated through a stuffing box 28. The gas from tube 23 passes through the line 29 to a boiler where heat is removed in any conventional manner. The gas is returned from the waste heat boiler through a tube 30 and thence upwardly through an annulus formed by concentric tubes 23 and 31. Tube 31 passes through and is fastened to a tube sheet 9 at the warm end of the exchanger. At the lower end tube 31 is made tight against the walls of the block 24 by means of block 39 and stuffing box 40 through which tube 31 can expand. The gas passing up through the annulus formed by tubes 23 and 31 is collected in the space defined by the upper tube sheet 9 and a plate 22. Here the gases are distributed to the tubes 6 and from there directed out of the system in the manner disclosed above. The tube 37 serves to by-pass the portion of the cold gas entering the converter through tube 36 around the heat exchanger as set forth in the description of FIGURE 1.

Normally, when steam is generated the by-pass tube 37 is not used for controlling the temperature of the gas going to the catalyst section. Sufficient heat is removed from the gas passing through the boiler to obtain the desired temperature of the gas returning from the boiler to the catalyst section. This temperature control is accomplished by a by-pass around the external boiler. When the boiler is out of commission the converter can be maintained in full production by passing the gas leaving the converter through tube 29 directly back to the converter through tube 30 and perform the temperature control by means of the by-pass of gas through tubes 36 and 37.

Improved catalyst cooling is made possible by passing the cool gas around the tubes containing the catalyst in co-current flow with respect to the gas flow in the catalyst. By proper spacing of baffles in the space around the tubes the heat transfer rate from the wall of the catalyst to the cooling gas can be varied along the tube wall. This permits heat removal from the catalyst at the rate it is generated, which varies as the gas descends through the catalyst. In the converter disclosed in Patent No. 2,853,371 mentioned above, the heat transfer rate for heat removal is practically constant along the cooling tubes and the heat removed is a function of the temperature difference only.

It is particularly desirable in the synthesis of methanol to maintain an even temperature throughout the catalyst bed. The reason for this is that the temperature range for optimum performance of the conventional zinc-chrome catalyst is very narrow. The optimum catalyst temperature is close to 375° C. At temperatures below 350° C. the activity of the catalyst decreases rapidly with decrease in temperature, and above 400° C. undesirable side reactions increase rapidly with the increase in temperature and the elevated temperature is detrimental to the life of the catalyst. Operation at or above a temperature of 425° C. is in the danger zone, where side reactions may cause complete loss of temperature control by violent heat evolution resulting in fusion of catalyst and overheating of converter internals. The following table shows that to maintain the main body of catalyst in a methanol converter at a constant temperature of 375° C. requires a variation of heat transfer rate from the hot gas in the catalyst to the cold gas passing around the catalyst tubes. The variation is a function of the reaction velocity at any point in the catalyst which can be calculated for design conditions.

In the following, the term "blue gas" indicates the synthesis gas prior to passage through the catalyst. The term "red gas" indicates the synthesis gas after it has passed through the catalyst. Generally, a small amount of catalyst is contained in tube 13 which is out of heat exchange relationship with the "blue gas." This provides for temperature adjustment to the proper temperature for optimum reaction within the main bed of catalyst. The portion of the catalyst out of contact with incoming "blue gas" is designated as "0" in the first column in the following table.

| Section No. | Temp. of Gas in Cat., ° C. | Retention Time per Sect. in Sec. | Cooling Surface per Sect., M². | Heat of Reaction per Section in Cal. | Temp. Increase Blue Gas in ° C. | Temp. of Blue Gas at End of Sect. in ° C. | Mean Temp. Diff. Red and Blue Gas in ° C. | Req. Heat Transfer Rate from Red to Blue Gas, Cal./ M².²/Hr./ ° C. |
|---|---|---|---|---|---|---|---|---|
| 0 | 350 / 375 | Corresponding to 1.6 Sec. @ 375° C. | None | | | | None | None |
|   |   |   |   | 925,000 | 0 | 218.00 |   |   |
| 1 | 375 | 1 | 4.82 | 525,000 | 14.50 | 232.50 | 149.75 | 726 |
| 2 | 375 | 1 | 4.82 | 475,000 | 13.10 | 245.60 | 135.95 | 740 |
| 3 | 375 | 1 | 4.82 | 425,000 | 11.72 | 257.32 | 123.54 | 715 |
| 4 | 375 | 1 | 4.82 | 375,000 | 10.36 | 267.68 | 112.50 | 692 |
| 5 | 375 | 1 | 4.82 | 350,000 | 9.66 | 277.34 | 102.49 | 708 |
| 6 | 375 | 1 | 4.82 | 325,000 | 8.96 | 286.30 | 93.18 | 722 |
| 7 | 375 | 1 | 4.82 | 300,000 | 8.28 | 294.58 | 84.56 | 735 |
| 8 | 375 | 1 | 4.82 | 300,000 | 8.28 | 302.86 | 76.28 | 815 |
| 9 | 375 | 1 | 4.82 | 280,000 | 7.74 | 310.60 | 68.27 | 850 |
| 10 | 375 | 1 | 4.82 | 250,000 | 6.90 | 317.50 | 60.95 | 852 |
| 11 | 375 | 1 | 4.82 | 230,000 | 6.35 | 323.85 | 54.33 | 878 |
| 12 | 375 | 1 | 4.82 | 210,000 | 5.80 | 329.65 | 48.25 | 902 |
| 13 | 375 | 1 | 4.82 | 190,000 | 5.25 | 334.90 | 42.72 | 922 |
| 14 | 375 | 1 | 4.82 | 170,000 | 4.70 | 339.60 | 37.75 | 935 |
| 15 | 375 | 1 | 4.82 | 145,000 | 4.00 | 343.60 | 33.40 | 900 |
| 16 | 375 | 1 | 4.82 | 115,000 | 3.08 | 346.68 | 29.86 | 800 |
| 17 | 375 | 1 | 4.82 | 95,000 | 2.63 | 349.31 | 27.00 | 730 |
| 18 | 375 | 0.3 | 1.45 | 25,000 | 0.69 | 350.00 | 25.34 | 680 |
|   |   |   |   | 5,710,000 | 132.00 |   |   |   |

Inspection of the last column of the table reveals that there is generally in this designed condition for synthesis of methanol a gradual increase in the amount of heat required to be transferred from the reacted gas to the unreacting gas. Knowing the amount of heat to be removed in each section of the catalyts tube the position of the baffles in the catalytic section could be easily ascertained to give the required heat exchange. It is readily apparent from the figures in the last column that the baffles 15 will in general be closer and closer together as they approach section 14 where the greatest amount of heat must be transferred. From there on down through remaining sections 15 to 18 the distance between the baffles 15 will gradually become greater. Since the greater need for heat transfer requires the higher velocity of unreacted gases about the catalyst bed, it would require only nominal calculation by one skilled in the art to determine the distance between the baffles in the various sections. By the practice of this invention there is greater control of process temperature in the synthesis of such compounds as methanol, ammonia and the like than has hitherto been possible.

I claim:

1. An apparatus for carrying out exothermic chemical reactions which comprises a converter shell with internal heat exchanger and reaction tubes containing a body of catalyst therein, baffle means to direct the gas about the tubes placed in the heat exchange section, means to collect the gases and means to direct said gases from the heat exchange section to that portion of the catalyst tubes which is farthest from the heat exchange section said latter means defining an annular space between the shell and the catalyst tube section, baffle means to direct the gases about the catalyst tubes to the section of said catalyst-containing tubes nearest the heat exchange section, means for collecting unreacted gases and distributing said unreacted gases to gas-carrying tubes embedded within the catalyst bed and in connection arrangement with the tubes containing the catalyst to define an annular bed of catalyst to direct the gases to the section of the catalyst-containing tubes farthest from the heat exchange section and to direct the unreacted gases through the catalyst, means to collect the reacted gases and direct said gases through tubes within the heat exchange section and means to allow gases from the heat exchange section to flow out of the converter.

2. An apparatus according to claim 1 which in addition includes means to introduce by-pass gas into the portion of the heat exchange section which is adjacent to catalyst section.

3. An apparatus according to claim 1 which includes means for collecting gases after reaction, means to conduct the gases from the converter to waste heat boiler, means to return the gases from the waste heat boiler and means to direct said gases into the heat exchange tubes.

4. An apparatus according to claim 3 in which by-pass gas inlet, outlet to the boiler, inlet from boiler and outlet from the system as they penetrate the converter shell are concentric tubes.

5. An apparatus for carrying out exothermic chemical reactions which comprises a converter shell with internal heat exchanger and reaction tubes containing a body of catalyst therein, a liner adjacent the converter shell to direct cool synthesis gas along the inner periphery of the shell, baffle means to direct the gas about the tubes placed in the heat exchange section, means to collect the gases and means to direct said gases from the heat exchange sections to that portion of the catalyst tubes which is farthest from the heat exchange section, baffle means to direct the gases about the catalyst tubes to the section said latter means defining an annular space between the liner and the catalyst tube section of said catalyst-containing tubes nearest the heat exchange section, means for collecting unreacted gases and distributing said unreacted gases to gas-carrying tubes embedded within the catalyst bed and in concentric arrangement with the tubes containing the catalyst to define an annular bed of catalyst to direct the gases to the section of the catalyst-containing tubes farthest from the heat exchange section and to direct the unreacted gases through the catalyst, means to collect the reacted gases and direct said gases through tubes within the heat exchange section and means to allow gases from the heat exchange section to flow out of the converter.

6. The apparatus according to claim 5 which includes means for collecting gases after reaction, means to conduct the gases from the converter to waste heat boiler, means to return the gases from the waste heat boiler and means to direct said gases into the heat exchange tubes.

7. The apparatus according to claim 6 in which by-pass gas inlet, outlet to the boiler, inlet from boiler and outlet from the system as they penetrate the converter shell are concentric tubes.

References Cited in the file of this patent

UNITED STATES PATENTS

| | | |
|---|---|---|
| 1,972,937 | Jaeger | Sept. 11, 1934 |
| 2,853,371 | Christensen et al. | Sept. 23, 1958 |
| 2,861,873 | Worn | Nov. 25, 1958 |
| 2,910,350 | Jean | Oct. 27, 1959 |

FOREIGN PATENTS

| | | |
|---|---|---|
| 178,631 | Austria | May 25, 1954 |

UNITED STATES PATENT OFFICE
CERTIFICATE OF CORRECTION

Patent No. 3,050,377                                    August 21, 1962

Axel Christensen

It is hereby certified that error appears in the above numbered patent requiring correction and that the said Letters Patent should read as corrected below.

Column 1, line 25, for "2,583,371" read -- 2,853,371 --; line 41, for "over" read -- above --; same column 1, line 54, for "gasses" read -- gases --; column 5, line 69, for "connection" read -- concentric --; column 6, lines 55 to 57, strike out "said latter means defining an annular space between the liner and the catalyst tube section" and insert the same after "section", in line 54, same column 6.

Signed and sealed this 11th day of December 1962.

(SEAL)
Attest:

ERNEST W. SWIDER                                         DAVID L. LADD
Attesting Officer                                          Commissioner of Patents